Figure 1:
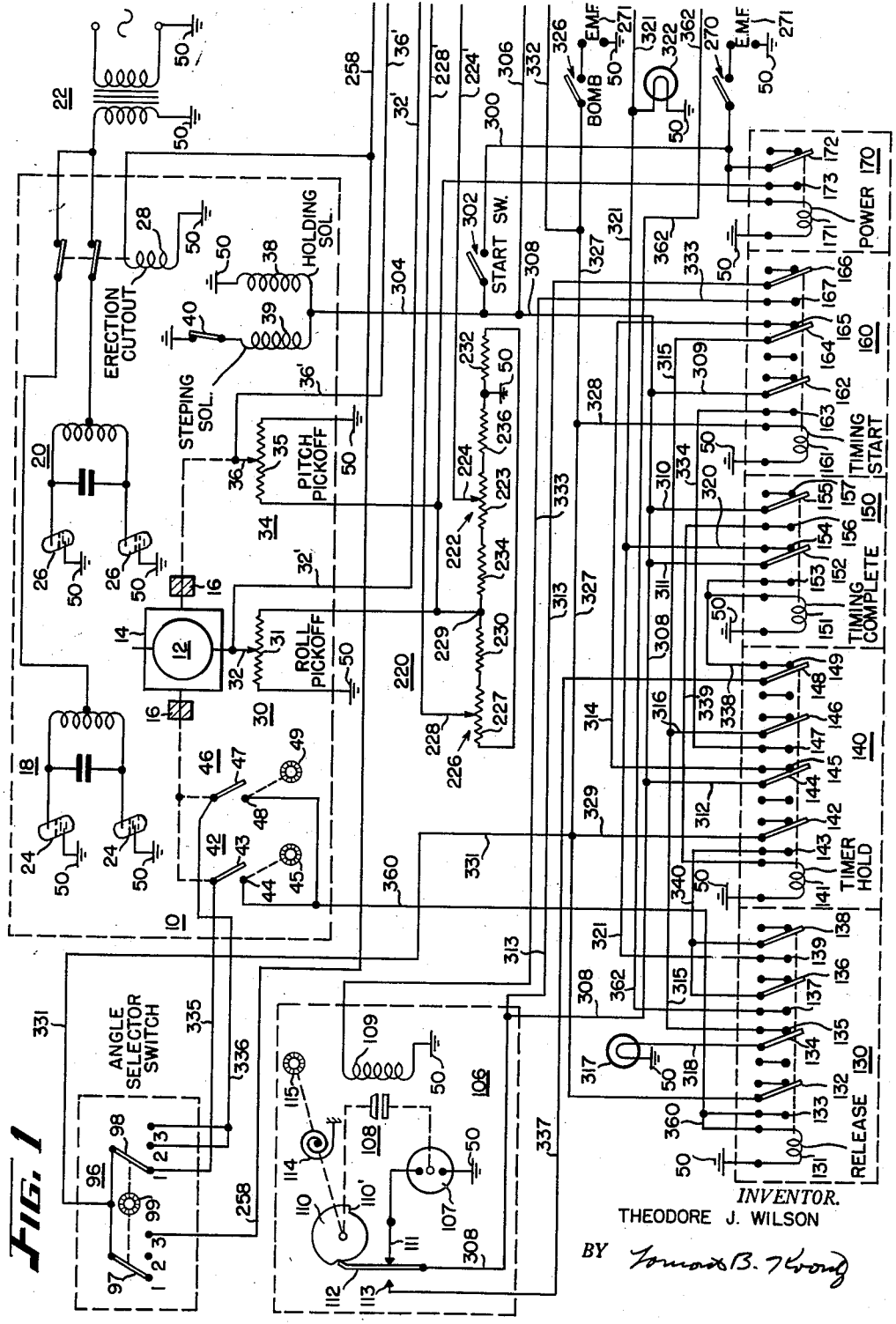

INVENTOR.
THEODORE J. WILSON

ATTORNEY

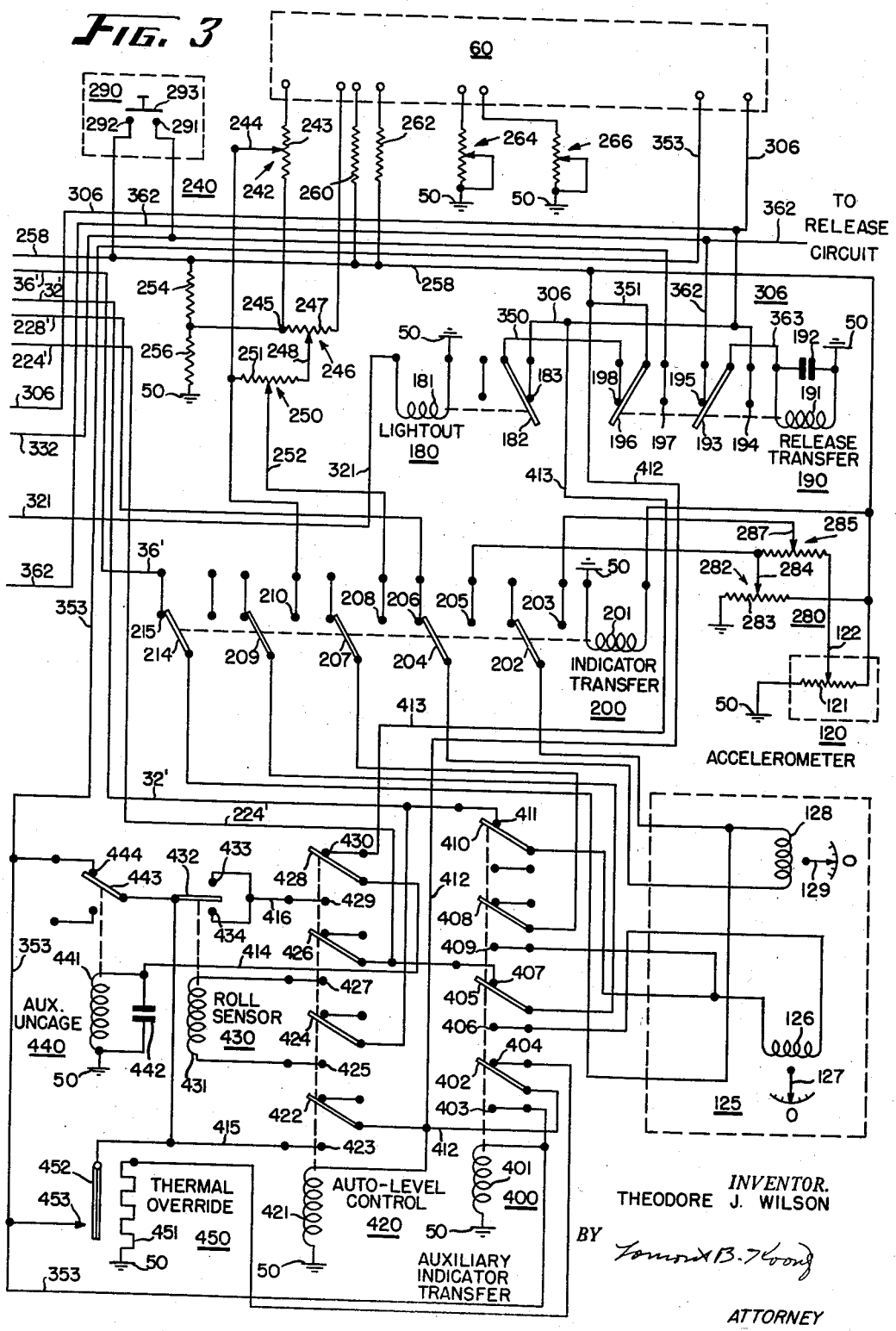

United States Patent Office 2,889,710
Patented June 9, 1959

2,889,710

AIRCRAFT ATTITUDE INDICATING APPARATUS

Theodore J. Wilson, Minneapolis, Minn., assignor to Minneapolis-Honeywell Regulator Company, Minneapolis, Minn., a corporation of Delaware Application September 8, 1955, Serial No. 533,152

6 Claims. (Cl. 74—5.34)

This invention pertains to an aircraft loft bombing system, and more specifically to a system for presenting information to the pilot so he may control the aircraft during the intricate loft bombing maneuvers. The present apparatus pertains to loft bombing systems wherein a gyroscope having its spin axis parallel to the lateral axis of the aircraft is used to sense deviations of the aircraft about its yaw and roll axes and presents this information to a device for use by the pilot. Thus, the pilot is informed of any deviations of the aircraft about its yaw and roll axes. Normally the roll-yaw gyro is held in a caged position until the aircraft begins the pull-up portion of the bombing maneuver. The roll-yaw gyro is then uncaged so that it can sense any deviations of the aircraft about its roll or yaw axes during the pull-up part of the maneuver. This invention comprises means preventing the uncaging of the roll-yaw gyro until the lateral axis of the aircraft is horizontal and time delay means overriding said uncaging prevention means of the horizontal gyro so that after a predetermined length of time, the horizontal gyro is uncaged regardless if the lateral axis of the plane is horizontal or not.

This system is advantageous in that should the lateral axis of the aircraft fail to become horizontal, the roll-yaw gyro will be uncaged regardless and thus be effective to present some information to the pilot rather than no information at all. Thus, even if the information is erroneous to a degree depending upon the angle between the wings and the horizontal at the time of uncaging, this information is better than no information at all.

This invention is an improvement over the copending application of Corles M. Perkins, Serial No. 517,211, filed June 22, 1955.

It is therefore an object of this invention to provide an improved loft bombing system.

A more specific object of the invention is to provide a method of controlling the uncaging of a roll-yaw gyro, the function of which is to provide steering information to the pilot during a loft bombing maneuver, the control of the uncaging of the roll-yaw gyro comprising means which prevent the uncaging of the gyro until the lateral axis of the aircraft upon which the gyro is mounted is horizontal but, if the lateral axis does not become horizontal, is effective to uncage the gyro after a predetermined time delay.

Figure 2:
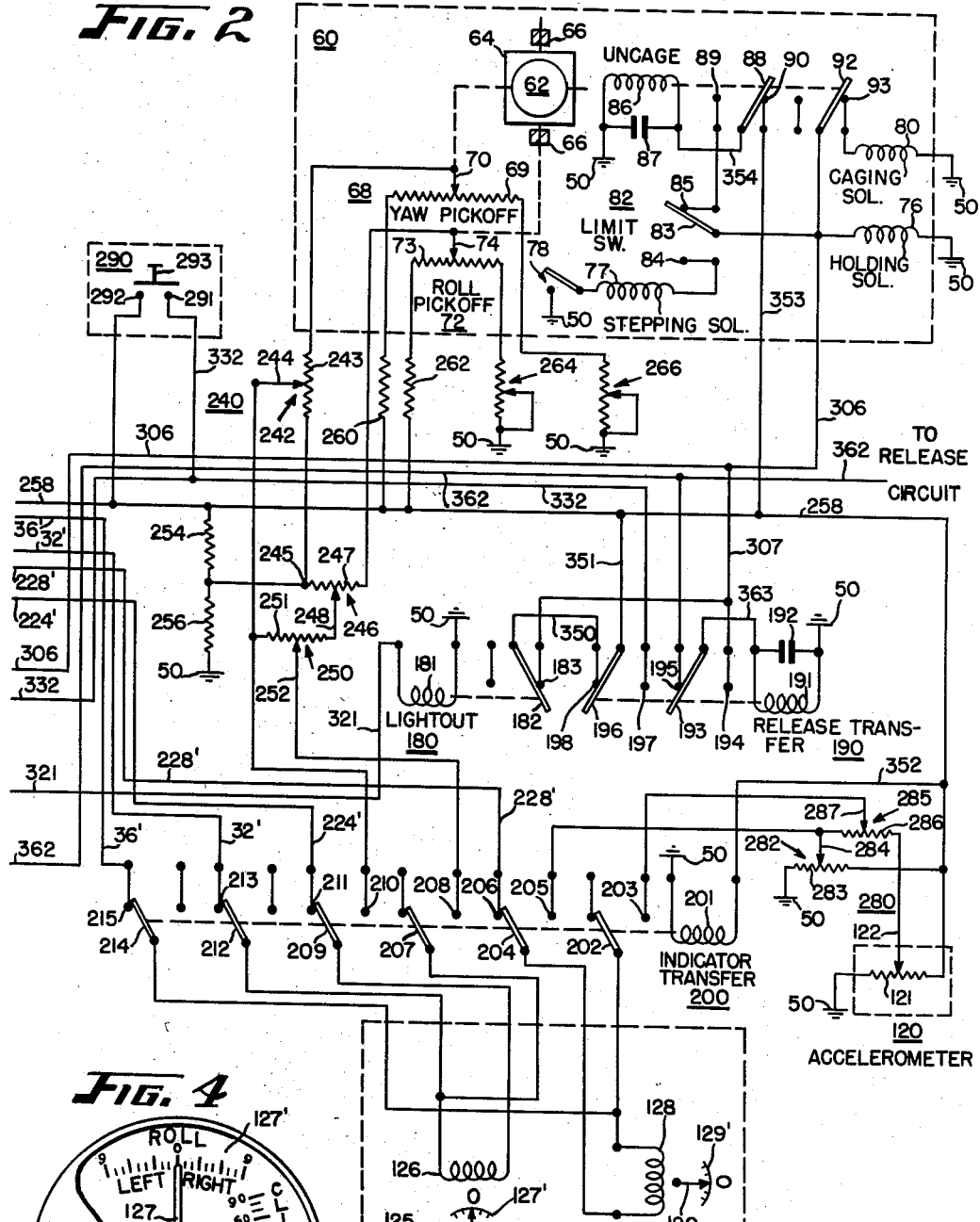
Figure 4:
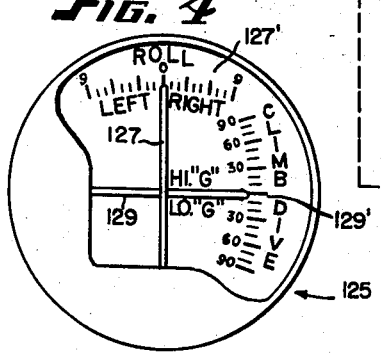

Other and more specific objects of the invention including the operation of loft bombing systems embodying my invention, will be set forth more fully in and become apparent from a reading of the following specification and appended claims in conjunction with the accompanying drawings in which:

Figure 1 and Figure 2 together schematically show a loft bombing system;

Figure 3 is a modification of the system shown in Figures 1 and 2 and is adapted to be a substitute for the portion of the basic system shown in Figure 2; and Figure 4 is a front view of an indicator of the type that may be used on the subject system.

The present loft bombing system comprises a vertical gyro 10 preferably of the cageable type such as that shown in the Brown Patent No. 2,645,129. Gyro 10 is schematically shown and comprises a rotor housing 12 supported for rotation in a gimbal 14 which in turn is supported for rotation in suitable frame means 16, the axis of rotation of gimbal 14 in frame 16 being at 90° to the axis of rotation of rotor housing 12 with respect to gimbal 14. Erection motors 18 and 20 receiving energization from an erection motor transformer 22 are each controlled by a pair of gravity sensitive mercury switches 24 and 26 which, as is well understood by those skilled in the art, respond to the earth's gravitational force so as to maintain the spin axis of gyro 10 perpendicular to the earth's surface. An erection cutout relay 28 is adapted, when energized to interrupt the energization circuits for erection motors 18 and 20. Roll and pitch pick-off potentiometers 30 and 34 comprising respectively resistive portions 31 and 35 and wiper members 32 and 36 are used as signal producing means for developing a signal proportional to deviation of the aircraft about its roll or longitudinal axis and its pitch or lateral axis.

Gyro 10 has a caging mechanism similar to the above mentioned Brown patent which is caged by spring means, not shown, and which is electrically uncaged by electromagnetic means including a holding solenoid 38, a stepping solenoid 39 and a stepping switch 40.

In addition to the pick-off potentiometer 34, a pair of sector switches 42 and 46 are associated with the pitch axis of vertical gyro 10. Sector switches 42 and 46 respectively comprise contacts 43 and 47 which are displaced in accordance to relative rotation between gimbal 14 and frame 16 of the gyro. The sector switches also comprise respectively adjustable contacts 44 and 48 which are capable of being independently adjusted by suitable manual adjusting means 45 and 49. Thus, by adjusting the relative positions of contacts 44 and 48, the point at which contact arms 43 and 47 come in contact with contacts 44 and 48 may be varied from any value between zero and 180° in pitch of the craft upon which gyro 10 is mounted. Sector switch 42 may be identified as the normal release switch and sector switch 46 as the alternate release switch. In the usual mode of operation, these switches are preset so that switch blade 43 will engage contact 44 at a different pitch attitude than that at which switch blade 47 engages contact 48.

The system also comprises a horizontal gyro 60 (see Figure 2) which is mounted on the aircraft so that its spin axis is normally parallel to the lateral or pitch axis of the aircraft and which, therefore, will sense displacement of the aircraft about its roll or longitudinal axis and yaw axis. Thus a rotor housing 62 is provided and is suitably journalled in a gimbal 64 which in turn is journalled by suitable means in frame 66. A pair of pick-off potentiometers 68 and 72 are provided as a means of developing a signal proportional to displacement of the aircraft about its yaw and roll axes and respectively comprise resistive portions 69 and 73 and wipers 70 and 74. In general horizontal gyro 60 may be similar to vertical gyro 10 with the exception that it does not have an erection system. A further difference is that provision of a second caging system which provides quick uncaging of rotor case 62 in addition to the spring and electromagnetically uncaged caging system of the type described in connection with vertical gyro 10. Thus, horizontal gyro 60 has a holding solenoid 76, a stepping solenoid 77, and a stepping switch 78 for uncaging rotor case 62, and, to this extent, is similar to the vertical gyro 10. In addition, horizontal gyro 60 has a caging solenoid 80 which operates a caging system completely independent of the first mentioned caging system.

The caging solenoid 80 with its associated caging mechanism may be generally similar in principle to that shown in the Tanner Patent No. 1,451,928. Thus solenoid 80 would be mounted on frame 66 and actuates a solenoid plunger, not shown, which engages rotor case 62 when coil 80 is energized so as to cage or lock rotor case 62 with respect to frame 66. Spring means, not shown, serve to retract the plunger away from rotor case 62 when coil 80 is deenergized thus providing a quick release. As long as caging solenoid 80 is energized, rotor case 62 will be locked with respect to frame 66 and the spin axis of the gyro 60 will be held parallel to the lateral axis of the aircraft. The reason for having an additional caging mechanism in the horizontal is to provide a means of quick uncaging of the gyro. As will be described in later detail below, the usual mode of operation of the horizontal gyro 60 is to electrically energize both caging mechanisms simultaneously which results in caging solenoid 80 keeping the gyro caged whereas energization of the caging mechanism including holding solenoid 76 and stepping solenoid 77 overpowers the spring caging means, not shown, and results in that caging system uncaging the gyro. However, as long as caging solenoid 80 remains energized the gyro still remains caged. Associated with the caging mechanisms is a limit switch 82 having a movable switch arm 83 and a pair of contacts 84 and 85. Normally switch arm 83 is in contact with fixed contact 84 but when the caging mechanism including the holding solenoid 76 and the stepping solenoid 77 have uncaged gyro 60 switch arm 83 is displaced so as to engage fixed contact 85.

Gyro 60 also comprises an uncage relay 86 including a condenser 87 in parallel with the coil thereof, relay 86 having two movable switch arms 88 and 92 as well as fixed contacts 89, 90 and 93.

A three-position angle selector switch 96 is provided in the system and it comprises a pair of switch arms 97 and 98 are ganged so as to be simultaneously moved to any one of the three positions shown by a suitable adjustment 99.

The system also comprises a timer or intervolometer 106 which may generally be of the type shown in the Haydon Patent 2,506,784. Timer 106 generally comprises a direct current electric motor 107, an electromagnetic clutch 108 including a clutch coil 109, and a cam member 110 having a raised portion 110' and driven, when clutch 108 is energized, by rotation of motor 107. Motor 107 has one terminal grounded as at 50 and is adapted to receive energization through a fixed contact 111 which cooperates with a movable contact blade 112 which is adapted to be displaced by cam member 110 and which is adapted to be connected to a souce of voltage under certain conditions as will be described below. When clutch coil 109 is deenergized, spring means 114 displace cam 110 to a point where as shown movable switch blade 112 is in engagement with fixed contact 111. After clutch coil 109 is energized rotation of motor 107 driving through clutch 108 will displace cam 110 so, after a suitable adjustable time interval determined by the setting of a manually adjustable knob 115 connected to cam 110, switch blade 112 is displaced by cam surface 110' away from fixed contact 111 and into engagement with a second fixed contact 113.

This system also comprises an accelerometer 120 of the potentiometer type which includes a resistive winding 121 one side of which is grounded as at 50 and a wiper member 122. This accelerometer may well be of the type shown and described in a copending application of C. R. Bonnell, filed August 11, 1954, Serial No. 449,035. Accelerometer 120 is mounted on the aircraft in such a position so as to sense accelerations of the aircraft along its vertical or yaw axis.

Another component of the system is an indicator 125 shown schematically on Figure 2 and mechanically on Figure 4. Indicator 125 may be of any suitable type to perform the necessary indication and as shown comprises a pair of meter movements 126 and 128 of the galvanometer type, the meter movements when energized being capable of moving pointers 127 and 129 respectively. As can be seen in Figure 2, pointer 127 is normally vertical and is adapted to be displaced either is normally horizontal and is adapted to be displaced to the right or to the left as shown while pointer 129 is normally horizontal and is adapted to be displaced up or down as shown. Pointer 127 registers with a scale 127' and will indicate either roll or yaw of the aircraft, while pointer 129 registers with a scale 129' and will indicate either pitch or acceleration of the aircraft along its yaw axis.

The system comprises a plurality of relays. Among these are a "release" relay 130 comprising a winding 131, movable switch blades 132 having an in contact 133; movable blade 134 having an out contact 135; movable contact 136 having an in contact 137; and movable contact blade 138 having an in contact 139. A "timer hold" relay 140 has a coil 141; a movable contact blade 142 having an in contact 143; a movable contact blade 144 having an out contact 145; a movable contact blade 146 having an in contact 147; and a movable contact blade 148 having an out contact 149. A "timing complete" relay 150 has a coil 151; a movable contact blade 152 having an in contact 153 and an out contact 154; and a movable contact blade 155 which has an in contact 156 and an out contact 157. A "timing start" relay 160 has a coil 161; a movable contact blade 162 having an in contact 163; a movable contact blade 164 having an out contact 165; and a movable contact blade 166 having an in contact 167. A "power" relay 170 has a coil 171 and a movable contact blade 172 having an in contact 173. A "light out" relay 180 (see Figure 2) has a coil 181 and a movable contact blade 182 with an out contact 183. A "release transfer" relay 190 has a coil 191 with a condenser 192 in parallel therewith; a movable contact blade 193 with an in contact 194 and an out contact 195; and a movable contact blade 196 having an in contact 197 and an out contact 198. An "indicator transfer" relay 200 has a coil 201; a movable contact blade 202 having an in contact 203; a movable contact blade 204 having an in contact 205 and an out contact 206; a movable contact blade 207 having an in contact 208; a movable contact blade 209 having an in contact 210 and an out contact 211; a movable contact blade 212 having an out contact 213; and a movable contact blade 214 having an out contact 215. Coils 131, 141, 151, 161, 171, 181, 191, and 201 are connected at one side thereof to ground 50.

A bridge network 220 is shown on Figure 1 and comprises in part a roll centering potentiometer 222 having a resistance portion 223 and a wiper 224 and a pitch centering potentiometer 226 having a resistance member 227 and a wiper 228. Bridge 220 also includes a pair of resistors 230 and 232 connected in series with the resistive portion 227 of pitch centering potentiometer 226 between a junction point 229 and ground 50, the arrangement being with resistive member 227 being between resistances 230 and 232. The bridge also includes a pair of resistors 234 and 236 in series with resistive member 223 of roll centering potentiometer 222 being connected between junction point 229 and ground 50, the arrangement being with resistive portion 223 being intermediate of resistances 234 and 236.

Referring to Figure 2 it will be noted that horizontal gyro 60 has a bridge network 240 associated with it. This includes a yaw ratio potentiometer 242 having a resistance portion 243 and a wiper 244; a roll ratio potentiometer 246 having a resistance member 247 and a wiper 248; a sensitivity adjustment potentiometer 250 having a resistance member 251 and a wiper 252. The resistive portion 243 of yaw ratio potentiometer 242 is connected between the wiper 70 of the yaw pick-off potentiometer 68 of the horizontal gyro 60 and one side of the resistive portion 247 of the roll ratio potentiometer 246, the other side of which is connected to the wiper 74 of the roll pickoff of the horizontal gyro 60. The common connection between resistive portions 243 and 247 is identified by numeral 245. The resistive portion 251 of the sensitivity potentiometer 250 is connected at one side to wiper 248 of the roll ratio potentiometer 246 and at the other side of the wiper 244 of the yaw ratio potentiometer 242. Wiper 244 of the yaw ratio potentiometer 242 is connected to in contact 210 of indicator transfer relay 200 and wiper 252 of the sensitivity potentiometer 250 is connected to the in contact 208 of the indicator transfer relay 200. The common point 245 between resistances 243 and 247 is connected to the midpoint of a voltage divider consisting of a pair of resistors 254 and 256 which are connected between ground and a conductor 258 which will be later shown to receive energization from a suitable voltage source during one part of the system operation. It will be noted that one side of each of the resistive portions 69 and 73 of the yaw pick-off potentiometer 68 and the roll pick-off potentiometer 72 of the horizontal gyro 60 are connected to said conductor 258 through resistors 260 and 262 respectively. The other sides of the yaw and roll pick-off resistive portions 69 and 73 are connected to ground through roll centering potentiometer 264 and yaw centering potentiometer 266 respectively.

Referring again to bridge 220 shown on Figure 1 it will be noted that point 229 between resistors 230 and 234 receives energization when power relay 170 is energized. This is done by the manual closing of a main power switch 270 which applies power from a source of suitable voltage 271 to the winding 171 thereof. Energization of the power relay 170 completes a circuit between movable switch blade 172 and its in contact 173 thus applying voltage not only to junction point 229 but also to the roll and pitch pick-offs 30 and 34 of the vertical gyro 10. It will be noted that the wipers 32 and 36 of the roll and pitch pick-offs respectively are connected by wires 32′ and 36′ to the out contacts 213 and 215 respectively of the indicator transfer relay 200. Further, the wiper 224 of the roll centering potentiometer and the wiper 228 of the pitch centering potentiometer 226 are connected by means of leads 224′ and 228′ to the out contacts 211 and 206 respectively of the indicator transfer relay 200. Thus, when the indicator transfer relay is deenergized meter movement 126 of the indicator 125 is connected between wiper 32 of the roll pick-off potentiometer 30 and wiper 224 of the roll centering potentiometer 222. Similarly the meter movement 128 of the indicator 125 is connected between the wiper 36 of the pitch pick-off potentiometer 34 of the vertical gyro 10 and the wiper 228 of the pitch centering potentiometer 226. The wipers 228 and 224 are adjusted so that when the aircraft is in straight and level flight the horizontal needle 129 and the vertical needle 127 of the indicator 125 are at their zero reference point as shown on Figures 2 and 3. Thereafter, should the aircraft pitch or roll, this indication sensed by the vertical gyro 10 will be transmitted by means of roll pick-off 30 and pitch pick-off 34 to the indicator thus giving the pilot a visual indication of any deviation away from straight and level flight.

A bridge 280 is provided for modifying the signal from the accelerometer 120. This includes a "G" calibration potentiometer 282 having a resistance portion 283 connected between ground 50 and lead 258 and a wiper 284. A "G" sensitivity potentiometer 285 has a resistance portion 286 connected between wiper 284 of the "G" calibration pot 282 and wiper 122 of the accelerometer 120. A wiper 287 of the "G" sensitivity potentiometer 285 is connected to in contact 203 of the indicator transfer relay 200 while wiper 284 of the "G" calibration potentiometer 282 is connected to in contact 205 of the indicator transfer relay 200. It will be appreciated that when lead 258 is energized the potentiometer in the accelerometer 120 and the yaw and roll pick-offs 68 and 72 of the horizontal gyro 60 are also energized as well as coil 201 of the indicator transfer relay 200. Thus indication of the indicator 125 is changed from the roll and pitch pick-offs of the vertical gyro 10 to the accelerometer 120 and the horizontal gyro in the following manner. The accelerometer signal is applied to the horizontal needle 129 through the in contacts 205 and 203 of the indicator transfer relay 200 and the combined roll-yaw signal of the horizontal gyro 60 is applied to the vertical needle 127 of the indicator 125 through in contacts 208 and 210 of the indicator transfer relay 200. Thus the horizontal needle 129 will now indicate accelerations of the aircraft along its yaw axis while the vertical needle 127 will show yaw and/or roll of the aircraft.

A manual yaw-roll switch 290 is provided as shown in Figure 2 and comprises a pair of contacts 291 and 292 which are adapted to be shorted out by a movable switch member 293.

OPERATION

As indicated above, when main power switch 270 is closed power relay 170 is energized thus applying voltage from the source of voltage 271 through movable switch blade 172 and its in contact 173 of power relay 170 to the bridge 220 as well as to the roll and pitch pick-offs 30 and 34 of the vertical gyro 10. Voltage is also applied from the load side of the switch 270 through a lead 300 to the line side of a start switch 302. When start switch 302 is closed voltage is applied through a lead 304 to the uncaging mechanism for the vertical gyro 10 causing it to uncage and voltage is applied through a lead 306 to the horizontal gyro 60 caging mechanisms. This energizes holding solenoid 76, stepping solenoid 77 and caging solenoid 80. The energization of holding solenoid 76 and stepping solenoid 77 causes that caging mechanism to uncage gyro 60. However, since caging solenoid 80 is energized it serves to maintain the caged condition of gyro 60 thus keeping the spin axis of the gyro parallel to the lateral axis of the craft. When stepping solenoid 77 has completely uncaged its mechanism, limit switch 82 is actuated so as to displace movable switch blade 83 into engagement with a fixed contact 85. This applies voltage from conductor 306 up to in contact 89 of the uncage relay 86. Closing the start switch 302 also applies voltage through a lead to the motor 107 in the timer 106 by passing through the cam actuated blade 112 and fixed contact 111. Voltage is also applied to movable switch blade 106 of timing start relay 160 from lead 308 through lead 313. Motor 107 rotates but at this point clutch coil 109 is not energized so that rotation of motor 107 has no effect on cam 110. Voltage is also applied from conductor 308 to movable switch blade 162 of the timing start relay 160 through conductor 309; to movable switch blade 155 of the timing complete relay 150 through conductor 310; to movable switch blade 152 of timing complete relay 150 through conductor 311; and to movable switch blade 144 of timer hold relay 140 through conductor 312. Timer hold relay 140 is deenergized at this time so the voltage on movable switch blade 144 is transmitted through out contact 145 to out contact 165 of timing start relay 160 through a conductor 314. Since timing start relay 160 is deenergized at this time, the voltage on out contact 165 is transmitted through movable switch blade 164 and a conductor 315 to fixed contact 135 of release relay 130 and from conductor 315 to movable switch blade 146 of timer hold relay 140 through a conductor 316. Release relay 130 is deenergized at this time so the voltage on out contact 135 thereof is transmitted to a light 317 through a conductor 318. Light 317 thus gives the pilot a visual indication that that portion of the system activated by the start switch 302 is energized. The timing complete relay 150 is deenergized at this time so voltage is transmitted through movable switch blade 152 to the out contact 154 thereof through conductor 320 to conductor 321 and thence to in contact 139 of the release relay 130 as well as to the coil 181 of the light out relay 180 (see Figure 2). When this happens a light 322 connected to conductor 321 is lit. The voltage applied to lead 306 by the closing of start switch 302 is brought to the out contact 183 of the light out relay 180 by a lead 307 but goes no further at this time since light out relay 180 is energized. Voltage also is supplied to out contact 194 of the release transfer relay 190 by lead 307 but goes no further at this time since release transfer relay 190 is deenergized.

Thus, at this time the vertical gyro 10 is uncaged, the roll and pitch pick-offs 30 and 34 are energized and indicator 125 shows any deviations of the craft about its roll and pitch axes. When the pilot gets to a desired identification point a bomb switch 326 is closed applying power from the source of voltage 271 through lead 327 and 378 to the timing start relay winding 161 thus energizing timing start relay 160; to movable switch blade 142 of the timer hold relay 140 through lead 329; to the movable switch blade 132 of the release relay 130; to switch blades 97 and 98 of the angle selector switch 96 through a lead 331; and through a lead 332 to in contact 197 of the release transfer relay 190 as well as fixed contact 291 of the manual yaw-roll switch 290. Energization of timing start relay 160 deenergizes the indicator light 317 and allows the voltage present on movable switch blade 166 thereof to be applied to in contact 167 and thence through lead 333 to the clutch coil 109 of the clutch 108 thus energizing it which permits the motor 107's rotation to be transmitted to cam 110 which then begins to rotate clockwise as shown in the drawing. Thus, after a predetermined adjustable time determined by the setting of knob 115, cam surface 110' comes in contact with movable blade 112 thereof so as to displace blade 112 away from fixed contact 111 into engagement with fixed contact 113. Energization of the timing start relay 160 also allows the voltage present on movable switch blade 162 to be applied to its in contact 163 and thence through lead 334 to in contact 147 of timer hold relay 140. When the angle selector switch 96 is in position "1" as shown power flows from movable switch blade 98 through a lead 335 to switch blade 43 of the sector switch 42. When the angle selector switch 96 is in either of positions "2" or "3" then the power is applied to switch arm 47 of the sector switch 46 through a lead 336. Since switch arms 43 and 47 are directly actuated by pitching of the aircraft, it follows that according to the setting of knobs 45 and 49 and of the angle selector switch 96 power will be transferred from switch arms 43 and 47 to the contacts 44 and 48 thereof.

After a predetermined time, which may be varied according to the wishes of the pilot by adjusting with knob 115 the initial position of cam 110 with respect to switch blade 112, cam surface 110' causes switch 112 to move to the left as shown in Figure 1 disengaging it with fixed contact 111 and engaging it with fixed contact 113. This temporarily deenergizes motor 107 and completes a circuit so that the voltage available on lead 308 is conducted through switch arm 112 to fixed contact 113 and thence through a lead 337 to movable switch blade 148 of the timer hold relay 140. Voltage then flows through the out contact 149 of the timer hold relay 140 and to coil 151 of the timing complete relay 150 through a lead 338 which also energizes the in contact 153 of the timing complete relay 150. This causes the timing complete relay 150 to pull in applying the voltage available on switch arm 152 to in contact 153 thus setting up a holding circuit for the timing complete relay 150 and allows the voltage available on switch arm 155 to be applied to in contact 156 which then by means of a conductor 339 energizes the timer hold relay winding 141 thus causing the timer hold relay 140 to pull in. Energization of the timer hold relay 140 allows the voltage available on movable switch arm 142 to be applied in contact 143 which then by means of a conductor 340 applies voltage to movable contact blades 136 and 138 of the release relay 130. Also the voltage available on in contact 147 is transmitted through movable switch blade 146, conductors 316 and 315, out contact 135 and movable switch blade 134 of release relay 130, and conductor 318 to re-light indicator lamp 317. Pulling in of the timing complete relay 150 removes the voltage from out contact 154 so as to deenergize conductors 320 and 321, and indicator light 322. Deenergization of conductor 321 causes the light out relay 180 to drop out. This allows the movable contact blade 182 thereof to engage its out contact 183 which as indicated is energized through leads 306 and 307. This applies a voltage through contacts 183 and 182 of the light out relay 180, a lead 350 to out contact 198 of the relay 190 and then through movable contact blade 196 thereof through a lead 351 thus energizing conductor 258, described above in connection with the bridge circuits 240 and 280 associated with the horizontal gyro pick-offs and accelerometer pick-off respectively. Energization of conductor 258 not only energizes the yaw and roll pick-offs 69 and 72 of the horizontal gyro as well as the resistive winding 121 of accelerometer 120 but also energizes indicator transfer relay 200 through a conductor 352 connected between the ungrounded side of the relay winding 201 and conductor 258. Energization of conductor 258 also energizes the uncage relay in horizontal gyro 60 through a conductor 353, out contact 90 of the uncage relay, movable switch blade 88 of the uncage relay and a conductor 354 between movable switch blade 88 and the uncage relay winding 86. As soon as the uncage relay pulls in it breaks its energization circuit between movable contact blade 88 and out contact 90 but condenser 87 holds enough of a charge so as to delay the drop out thereof long enough so that movable switch blade 88 may pick up new energization from in contact 89 which as indicated above is energized through conductor 306, movable switch blade 83 and fixed contact 85 of the limit switch 82. Thus the uncage relay 86 remains energized and the circuit is broken between movable switch blade 92 and out contact 93 thereof so as to deenergize the caging solenoid 80 of the horizontal gyro 60 which now permits the horizontal gyro to be completely uncaged.

Energization of the indicator transfer relay 200 causes movable switch blades 202, 204, 207, and 209 to come in contact respectively with in contacts 203, 205, 208, and 210. This couples the combined output of the roll and yaw pickoffs 72 and 68 to the vertical needle 127 of the indicator 125 and couples the output of the accelerometer 120 and "G" calibration potentiometer 280 to the horizontal needle 129 of the indicator 125. Thus any change in yaw or roll of the aircraft being sensed by horizontal gyro 60 will be indicated on the vertical needle 127 while all accelerations along the aircraft's vertical or yaw axis are sensed by accelerometer 120 and are compared with the setting of the "G" calibration potentiometer 280 so as to give a visual indication on the horizontal needle 129 of the indicator 125.

Energization of conductor 258 also energizes the erection cutout relay 28 in the vertical gyro 10 so as to deenergize the erection motors 18 and 20 associated therewith. This allows the vertical gyro 10 to remain relatively uninfluenced by accelerations acting upon the mercury contained in the gravity sensitive switches 24 and 26.

Referring to the angle selector switch 96 it will be observed that when said switch is in position number "3" a connection is established between lead 331 and conductor 258. The effect of this is to completely bypass out of the system the operation of timer 106 in that closing of the bomb switch 326 will immediately energize conductor 258 which in turn causes the horizontal gyro 60 to completely uncage, the accelerometer and the yaw-roll pick-offs 122, 68 and 72 to be energized as well as energizing the indicator transfer relay 200. In short, by moving angle selector switch to position "3," the timed portion of the operation is eliminated.

When the timing cycle is completed light 322 is extinguished and light 317 is relit thus giving the pilot a visual indication that this portion of the maneuver has been completed. The pilot then begins to change the craft's pitch attitude, pulling up or diving as the case may be. The indicator 125 provides the pilot with the information needed for controlling the craft during this portion of the maneuver. Since it is desired to maintain a straight heading, the pilot desires to know any change in roll or yaw of the craft. Thus this information from the horizontal gyro 60 is presented by the vertical needle 127 of the indicator 125 and the pilot controls the craft so that needle 127 stays on the zero reference mark. Also, during this portion of the maneuver, it is desired that the pilot maintain a constant acceleration of the craft along the yaw axis. This is done by setting the wiper 284 on the "G" calibration potentiometer 282 to a point corresponding to the desired number of "G's" that the specific maneuver calls for. The effect of displacing the wiper 284 is to unbalance the bridge formed by resistances 283 and 121 between conductor 258 and ground which applies a signal to the meter movement 128 controlling the horizontal needle 129 of indicator 125. Thus needle 129 will be displaced away from the zero position and can be brought back to the zero position only by the pilot executing the maneuver so as to impose an acceleration along the yaw axis of the aircraft that will have an effect on accelerometer 120 so as to displace its wiper 122 in an amount sufficient so as to nullify the effect of displacement of wiper 284.

As the plane's pitch attitude changes during this portion of the maneuver, relative movement occurs between contacts 43 and 47 of the sector switches 42 and 46 and their respective fixed contacts 44 and 48. Assuming that angle selector switch 96 is in position "1," as shown, then, when a pitch attitude has been reached where contact between the movable switch blade 43 and its fixed contact 44 occurs then voltage is applied from lead 335 through lead 360 to winding 131 and in contact 133 of the release relay 130. This causes the energization of release relay 130 which applies the voltage available on movable switch blade 136 to in contact 137 and thence through a lead 362 to out contact 195 of the release transfer relay 190 and thence through its movable contact blade 193 through a conductor 363 to winding 191 thereof. The voltage on lead 362 is also applied (see Figure 2) to the circuit (not shown) controlling the release of a bomb or the like. This pulse of energy causes release transfer relay 190 to pull in which immediately breaks its energization circuit which would tend to deenergize it. However, condenser 192 in parallel with winding 191 causes release transfer relay 190 to hold in until it picks up energization from in contact 194 through movable blade 193 and lead 363. Movable blade 196 moves over and continues to receive energization, now through in contact 197 so conductor 258 with its accompanying circuits above identified continues to be energized. Also when the release relay 130 pulls in the light out relay 180 is reenergized through movable switch blade 138 and in contact 139 and lead 321.

When angle selector switch 96 is in position "2," the operation of the system is substantially the same as when switch 96 is in position "1" except that alternate sector switch 46 has the control over the energization of release relay 130 instead of normal sector switch 42.

When angle selector switch 96 is in position "3," the operation of the system is altered to the extent that as soon as the bomb switch 326 is closed, conductor 258 is energized (assuming the start switch 302 and power switch 270 had previously been closed). This uncages the horizontal gyro 60, energizes the indicator transfer relay 200 so as to transfer indication of meter 125 from roll and pitch to yaw-roll and acceleration about the pitch axis. Knob 115 on timer 106 then can be adjusted so as to immediately energize lead 337 and thus, through timing complete and timer hold relays 150 and 140, energize movable switch blade 136 of release relay 130. Then when the craft's pitch attitude is such that contacts 47 and 48 of sector switch 46 close, release relay 130 will be effective to release the bomb by the energization of lead 362.

After release relay 130 pulls in light 322 is relit and light 317 is extinguished thus indicating that release has taken place and serves as a signal to the pilot that he may terminate this portion of the maneuver. The pilot may then release bomb switch 326 which deenergizes conductor 258 so as to deenergize the indicator transfer relay 200 so as to transfer indication on the indicator 125 from roll-yaw and acceleration back to roll and pitch. It will be observed that when conductor 258 is deenergized by the release of the bomb switch 326 that the uncage relay 86 does not become deenergized inasmuch as it is receiving its energization from conductor 306 through limit switch 82 and in contact 89 of the uncaged relay. Thus the horizontal gyro 60 is still uncaged and should the pilot desire to receive information concerning the roll and yaw as well as the acceleration of the aircraft along its yaw axis he may do so by repressing the bomb button which will reenergize conductor 258 and thence indicator transfer relay 200 as well as the bridges 280 and 240 associated with the accelerometer and horizontal gyro 60's pick-off respectively.

The manual yaw-roll switch 290 allows the pilot a manual means of uncaging the horizontal gyro 60 and transferring indication of the indicator 125 from roll and pitch to yaw-roll and acceleration about the pitch axis. When the bomb switch 326 is closed (subsequent to the closing of the main power switch 270 and the start switch 302), conductor 332 is energized which applies a voltage to contact 291 of switch 290. Then, shorting of contacts 291 and 292 by movable switch member 293 applies the voltage to above described conductor 258 to uncage gyro 60, etc.

*Figure 3*

As indicated above the circuitry shown in Figure 3 represents a modification of the circuitry shown in Figures 1 and 2 together and is intended to be used in place of Figure 2. Similar components are identified by the same identification figures in Figure 3 as were used in Figure 2. The modification of the system provides a solution for a problem that might occur in the operation of the basic system. The problem is that the horizontal gyro 60 may be uncaged when the wings of the aircraft are not level. Since the spin axis of the horizontal gyro is held parallel to the pitch or lateral axis of the aircraft prior to uncaging it follows that if the pitch axis of the aircraft is not parallel with the surface of the earth when gyro 60 is uncaged, the gyro in such a condition will give false information as far as roll is concerned to the indicator 125. Stated otherwise if the pilot tends to keep the needle 127 centered at the zero mark on the indicator when the horizontal gyro was uncaged with its spin axis not parallel to the earth's surface he will not be traveling, as desired, in a plane perfectly perpendicular to the earth's surface but at an angle thereto equal to the amount of the angle between the wings of the aircraft at the instant the roll-yaw gyro 60 was uncaged and the true horizontal. It is the intent of the circuitry shown in Figure 3 to overcome this disadvantage. The disadvantage is overcome by providing a means of preventing the uncaging of the horizontal gyro 60 until the wings of aircraft are level. An additional important feature is that of an overriding mechanism which allows the horizontal gyro 60 to be uncaged after a suitable time delay even if the wings are not level so that the information from the horizontal gyro 60 may be used. Thus some information, even if erroneous, will be presented to the indicator which is preferable to no information at all. This will be better understood by referring to the description below. It is noted that a group of additional relays are added in Figure 3 to the circuitry of Figure 2. An "auxiliary transfer" relay 400 has a winding 401, movable switch blades 402, 405, 408, and 410; in contacts 403, 406, 409; and out contacts 404, 407, and 411. An "auto level control" relay 420 has a winding 421; movable switch blades 422, 424, 426, and 428; in contacts 423, 425, 427, and 429; and out contact 430. A "roll sensor" relay 430 has a coil 431 connected to in contacts 425 and 427 of auto level control relay 420, a movable switch blade 432 and a pair of fixed contacts 433 and 434. Roll sensor relay 430 is physically designed so that when it is receiving no energization the movable switch blade 432 is positioned as shown intermediate of fixed contacts 433 and 434. When it does receive an energization, even of low magnitude, it causes switch arm 432 to be displaced one way or the other depending upon the sense of the energization so as to complete a circuit between the movable blade and one of the fixed contacts. An "auxiliary uncaged" relay 440 has a coil paralleled by a condenser 442, a movable switch blade 443 and an out contact 444. A "thermal override" relay 450 has a heating element 451 grounded at one end as at 50, a bimetallic heat responsive member 452 serving as a movable switch blade, and a fixed contact 433 adapted to cooperate with movable switch member 452. Relay windings 401, 421, and 441 are grounded as at 50 on one side thereof. It will be noted that the lead 32' leading from the roll pick-off potentiometer wiper 32 of the vertical gyro 10 no longer is switched by the indicator transfer relay 200 but is led to out contact 411 of auxiliary indicator transfer relay 400 as well as to the movable switch blade 424 of the roll sensor relay 430. Further, it will be noted that lead 224' leading from the roll centering potentiometer 222 no longer is switched by the indicator transfer relay 200 but instead is led directly to out contact 407 of auxiliary indicator transfer relay 400 as well as to movable switch blade 426 of the roll sensor relay 430. Therefore, when the auto level control relay 420 is energized the winding 431 of the roll sensor relay 430 is effectively connected directly to wiper 32 on the roll pick-off potentiometer of the vertical gyro 10 and to the wiper 224 of the roll centering potentiometer 222. Thus, if there is any nonlevel condition of the wings at that time, this will be sensed by the roll pick-off potentiometer 30 so as to develop a signal in winding 431 of the roll sensor relay 430 so as to pull the same in and complete a circuit between its movable switch blade 432 and one of its fixed contacts 433 and 434. A lead 412 connects the ungrounded side of the winding 421 of the auto level control relay 420 to conductor 258, said conductor 412 also connecting movable switch blade 402 of the auxiliary indicator transfer relay to conductor 258. Thus, during the operation of the system, when conductor 258 becomes energized either due to the completion of the timing cycle or by moving the angle selector switch 96 to position "3," auto level control relay 420 is energized. A lead 413 provides a connection between lead 306 and out contact 430 of the auto level control relay 420. Since lead 306 is energized whenever start switch 302 is closed, it follows that voltage will be available also at said out contact 430. Prior to the auto level control relay being energized the auxiliary uncage relay 440 is energized from said contact 430 through movable switch blade 428 of the auto level control relay 420 and thence through a conductor 414. This breaks the circuit between movable switch blade 443 and out contact 444 of the auxiliary uncaged relay 440.

*Operation of Figure 3*

Upon the completion of the timing cycle (or movement of angle selector switch 96 to position "3") conductor 258 becomes energized thus energizing the auto level control relay 420. Movable switch blade 422 of the auto level control relay 420 is also energized from lead 412 from lead 258 and when the auto level control relay 420 pulls in it applies voltage to in contact 423 and thence through conductor 415 to the movable contact blade 432 of the roll sensor relay 430, movable contact blade 443 of the auxiliary uncage relay 440 and switch blade 452 of the thermal override relay 450. Voltage also is applied to movable switch blade 402 of the auxiliary indicator transfer relay 400, and since the latter is deenergized at this point, allows voltage to be transferred out through the out contact 404 to heating element 451 of the thermal override relay 450. This causes switch blade 452 to gradually move towards fixed contact 453 thereof. If the wings of the aircraft are level roll sensor relay will not be energized and hence no circuit will be established between energized switch blade 432 and the fixed contacts 433 and 434. Auxiliary uncage relay 440 will then be deenergized allowing energized switch blade 443 thereof to engage out contact 444 thereof applying voltage to conductor 353 so as to energize the uncage relay 86 and thus allow the horizontal gyro 60 to uncage. It will be noted that conductor 353 is also connected to the fixed contact 453 of the thermal override relay 450 as well as to the coil 401 of the auxiliary indicator transfer relay 400 and the in contact 403 thereof. Thus at the same time the horizontal gyro 60 uncages the auxiliary transfer relay 400 is energized which transfers the indication of the vertical needle 127 of indicator 125 from roll as sensed by the vertical gyro 10 to yaw-roll as sensed by the horizontal gyro 50. However, if the wings of the aircraft are not level at this point a voltage will be developed in roll sensor relay winding 431 so as to cause displacement of switch blade 432 one direction or the other completing a circuit for energizing auxiliary uncage relay winding 441 through a conductor 416, in contact 429 of the auto level control relay 420, and conductor 414 to the auxiliary uncage relay 440. The purpose of condenser 442 is to prevent the auxiliary uncage relay 440 from becoming deenergized after the auto level control relay pulls in assuming there is a non-wings level condition. To explain, before the auto level control relay pulls in the auxiliary uncaged relay is energized through out contact 430 thereof to lead 306. When the auto level control relay pulls in and the wings are not level then immediately there is a new energization circuit for the auxiliary uncage relay and the condenser 442 provides a sufficient time lag in dropping out of said auxiliary uncage relay so as to prevent the switch blade 443 from coming in contact with the out contact 444 thereof so as to uncage the horizontal gyro.

As soon as the pilot gets the wings of the aircraft level there no longer will be a signal developed in winding 431 of the roll sensor relay so that switch blade 432 will be moved to its center position so as to deenergize auxiliary uncage 440 and allow the horizontal gyro 62 to uncage as well as energizing auxiliary indicator transfer relay 400. It will be noted that when auxiliary indicator transfer relay 400 does pull in a holding circuit is completed between movable switch blade 402 and in contact 403 thereof.

If the pilot does not get the wings of the aircraft level within a suitable time, the thermal override relay 450 provides a means of overriding the roll sensor relay 430 in the following manner. It was above noted that as soon as the auto level control relay 420 was energized the thermal override relay heating element 451 was also energized. Thus the switch blade 452 gradually moves towards fixed contact 453. After a suitable time delay, contact is made between blade 452 and fixed contact 453 thus uncaging the horizontal gyro 60 as well as energizing auxiliary indicator transfer relay 400.

It will be observed that this apparatus shown in Figure 3 serves the purpose of delaying the switchover of information to the vertical needle 127 of the indicator 125 until the wings of the aircraft are level or until a suitable time delay has been reached as the case may be but does not affect the transfer of information to the horizontal needle 129 of the indicator 125 from pitch of the aircraft as sensed by the vertical gyro 10 to acceleration of the aircraft about along its yaw axis as sensed by accelerometer 120.

While I have shown and described a specific embodiment of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

What I claim is:

1. In an attitude responsive system for an aircraft having longitudinal, lateral, and yaw axes: a first gyro having a spin axis normally parallel to said yaw axis of said aircraft and sensing deviations of said aircraft about said longitudinal and lateral axes, said gyro having pickoff means responsive to said deviations about said longitudinal and lateral axes; a second gyro having a spin axis normally parallel to said lateral axis of said aircraft and sensing deviations of said aircraft about its longitudinal and yaw axes, said second gyro having pickoff means responsive to said deviations about said longitudinal and yaw axes; signal responsive means; means for caging and uncaging said second gyro; means for connecting said pickoff means of said first gyro to said signal responsive means while said second gyro is caged so that said signal responsive means responds to deviations of said aircraft about its lateral and longitudinal axes; means for disconnecting said pickoff means of said first gyro from said signal responsive means and for connecting said pickoff means of said second gyro to said signal responsive means when said second gyro is uncaged so that said signal responsive means responds to deviations of said aircraft about its longitudinal and yaw axes, first means controlling said uncaging means of said second gyro so that said second gyro may be uncaged when said lateral axis of said aircraft is substantially horizontal, and second means including timing means controlling said uncaging means of said second gyro so that said second gyro may be uncaged after a predetermined length of time, said second means being effective to cause uncaging of said second gyro after said predetermined length of time regardless of the position of said lateral axis of said aircraft.

2. In an attitude indicating system for an aircraft having roll, pitch, and yaw axes: a first gyro having a spin axis normally parallel to said yaw axis of said aircraft and sensing deviations of said aircraft about said roll and pitch axes, said gyro having signal producing means responsive to said deviations of said aircraft about said roll and pitch axes; a second gyro having a spin axis normally parallel to said pitch axis of said aircraft and sensing deviations of said aircraft about its roll and yaw axes, said second gyro having signal controlling means responsive to said deviations of said aircraft about said roll and yaw axes; signal responsive means; accelerometer means positioned on said aircraft and responding to acceleration of said aircraft along its yaw axis, said accelerometer means including signal controlling means for developing a signal indicative of said accelerations; means for disconnecting said signal producing means of said first gyro from said signal responsive means and for connecting said signal controlling means of said second gyro and said accelerometer to said signal responsive means so that said signal responsive means indicates deviations of said aircraft about its roll and yaw axes and accelerations of said aircraft along its yaw axis, first means for controlling the connection of said signal controlling means of said second gyro to said signal responsive means so that the connection of said signal controlling means of said second gyro to said signal responsive means may be effected when said pitch axis of said aircraft is substantially horizontal, and second means including timing means for controlling the connection of said signal controlling means of said second gyro to said signal responsive means so that the connection of said signal controlling means of said second gyro to said signal responsive means may be effected after a predetermined length of time, said second means being effective to control the connection of said signal controlling means of said second gyro to said signal responsive means after said predetermined length of time regardless of the position of said pitch axis of said aircraft.

3. In an attitude responsive system for an aircraft having longitudinal, lateral, and yaw axes: a gyro having a spin axis normally parallel to said lateral axis of said aircraft and sensing deviations of said aircraft about its longitudinal and yaw axes, said gyro having pickoff means responsive to said deviations about said longitudinal and yaw axes; means for caging and uncaging said gyro; signal responsive means connected to said pickoff means; first means for controlling said uncaging means of said gyro so that said gyro may be uncaged only when said lateral axis of said aircraft is substantially horizontal, and second means including timing means for controlling said uncaging means of said gyro so that said gyro may be uncaged after a predetermined length of time, said second means being effective to cause uncaging of said gyro after said predetermined length of time regardless of the position of said lateral axis of said aircraft.

4. In a navigation system for a dirigible craft having longitudinal, lateral, and yaw axes: a gyro having a spin axis normally parallel to said lateral axis and sensing deviations of said aircraft about its longitudinal and yaw axes; pickoff means on said gyro for developing signals indicative of said deviations; signal responsive means; means normally rendering said gyro inoperative; circuit means for rendering said gyro operative and for connecting said pickoff means to said signal responsive means when said lateral axis of said aircraft is horizontal, and additional circuit means including time delay means for rendering said gyro operative and for connecting said pickoff means to said signal responsive means after a predetermined length of time regardless of the position of said lateral axis of said aircraft.

5. In a navigation system for a dirigible craft having longitudinal, lateral, and yaw axes: a gyro having a spin axis normally parallel to said lateral axis and sensing deviations of said aircraft about its longitudinal and yaw axes; pickoff means on said gyro for developing a signal indicative of said deviations; signal responsive means; means connecting said pickoff means to said signal responsive means; means normally rendering said gyro inoperative; means for rendering said gyro operative when said lateral axis of said aircraft is horizontal, and additional means including time delay means for rendering said gyro operative after a predetermined length of time regardless of the position of said lateral axis of said aircraft.

6. In a navigation system for a dirigible craft having longitudinal, lateral, and yaw axes: a gyro having a spin axis normally parallel to one of said axes and sensing deviations of said aircraft about its other two axes; pickoff means on said gyro for developing signals indicative of said deviations; signal responsive means; means connecting said pickoff means to said signal responsive means; means normally rendering said gyro inoperative; circuit means for rendering said gyro operative when said one axis of said aircraft is at a preselected attitude, and additional circuit means including time delay means for rendering said gyro operative after a predetermined length of time regardless of the position of said one axis of said aircraft.

No references cited.